United States Patent
Jang et al.

(10) Patent No.: US 11,519,347 B2
(45) Date of Patent: Dec. 6, 2022

(54) GAS ENGINE HEAT PUMP AND METHOD OF OPERATING THE SAME

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/407,312

(22) Filed: Aug. 20, 2021

(65) Prior Publication Data

US 2022/0056857 A1  Feb. 24, 2022

(30) Foreign Application Priority Data

Aug. 21, 2020 (KR) .................. 10-2020-0105221

(51) Int. Cl.
*F02D 31/00* (2006.01)
*F02B 37/12* (2006.01)
(Continued)

(52) U.S. Cl.
CPC ............ *F02D 31/007* (2013.01); *F02B 37/12* (2013.01); *F02B 39/10* (2013.01); *F02B 63/06* (2013.01);
(Continued)

(58) Field of Classification Search
CPC .... F02B 37/12; F02B 2037/122; F02B 39/10; F02B 43/00; F02B 63/06; F02D 19/022;
(Continued)

(56) References Cited

U.S. PATENT DOCUMENTS

| | | | |
|---|---|---|---|
| 3,867,919 A * | 2/1975 | Grenier .................. | F02M 23/04 123/DIG. 11 |
| 6,195,985 B1 * | 3/2001 | del Re .................. | B60W 10/06 123/DIG. 11 |

(Continued)

FOREIGN PATENT DOCUMENTS

| | | | | |
|---|---|---|---|---|
| EP | 3343004 A1 * | 7/2018 | ............. | F02D 29/06 |
| EP | 3343006 A1 * | 7/2018 | ............. | F02D 19/02 |

(Continued)

OTHER PUBLICATIONS

European Search Report issued in Application No. 21192404.8 dated Jan. 19, 2022.

*Primary Examiner* — John M Zaleskas
(74) *Attorney, Agent, or Firm* — KED & Associates (57) ABSTRACT

A gas engine heat pump is provided including an engine having an ignition plug, a compressor connected to the engine, a mixer that mixes air and fuel and supplies the mixture to the engine, a zero governor having a valve that regulates the fuel supplied to the mixer, a throttle valve disposed between the mixer and the engine to regulate a flow of the mixture to the engine, and a controller. Upon receiving a command to stop running the engine, the controller changes a target number of revolutions of the engine, controls an opening degree of the valve based on the target number of revolutions if a current number of revolutions of the engine exceeds a first reference number, and controls the ignition plug to stop igniting if the current number of revolutions of the engine reaches a second reference number which is lower than the first reference number.

15 Claims, 6 Drawing Sheets

(51) Int. Cl.

| | | |
|---|---|---|
| *F02B 39/10* | (2006.01) | |
| *F02D 29/04* | (2006.01) | |
| *F25B 27/02* | (2006.01) | |
| *F02B 63/06* | (2006.01) | |
| *F02D 41/04* | (2006.01) | |
| *F25B 27/00* | (2006.01) | |
| *F02D 19/02* | (2006.01) | |
| *F02D 41/00* | (2006.01) | |
| *F02B 43/00* | (2006.01) | |
| *F25B 13/00* | (2006.01) | |

(52) U.S. Cl.
CPC ............ *F02D 19/023* (2013.01); *F02D 29/04* (2013.01); *F02D 41/0007* (2013.01); *F02D 41/0027* (2013.01); *F02D 41/042* (2013.01); *F25B 27/00* (2013.01); *F25B 27/02* (2013.01); *F02B 43/00* (2013.01); *F02B 2037/122* (2013.01); *F02D 19/022* (2013.01); *F02D 2200/101* (2013.01); *F25B 13/00* (2013.01); *F25B 2327/001* (2013.01)

(58) Field of Classification Search
CPC ............ F02D 19/023; F02D 2200/101; F02D 2200/1012; F02D 29/04; F02D 31/007; F02D 41/0027; F02D 41/042; F25B 13/00; F25B 2327/001; F25B 27/00; F25B 27/02

See application file for complete search history.

(56) References Cited

U.S. PATENT DOCUMENTS

| | | | |
|---|---|---|---|
| 6,260,535 B1 * | 7/2001 | Froeschl | F02D 41/042 |
| | | | 903/917 |
| 2002/0073955 A1 * | 6/2002 | Collins | F01L 9/20 |
| | | | 123/198 DB |
| 2006/0157023 A1 * | 7/2006 | Matsuki | F02D 41/042 |
| | | | 123/179.5 |
| 2014/0020668 A1 * | 1/2014 | Ishida | F02D 19/029 |
| | | | 123/704 |
| 2014/0366840 A1 * | 12/2014 | Sivasubramanian | ........ |
| | | | F02D 19/081 |
| | | | 123/399 |
| 2015/0019109 A1 * | 1/2015 | Trofimov | F02N 11/0814 |
| | | | 701/102 |
| 2017/0241353 A1 * | 8/2017 | Young | F02D 31/007 |
| 2018/0080404 A1 * | 3/2018 | Nair | G01P 21/02 |
| 2019/0249614 A1 * | 8/2019 | Suzuki | F02D 41/18 |
| 2019/0277219 A1 * | 9/2019 | Kang | F02D 41/3809 |
| 2021/0262410 A1 * | 8/2021 | Doering | F02D 41/042 |

FOREIGN PATENT DOCUMENTS

| | | | | |
|---|---|---|---|---|
| EP | 3 613 962 | | 2/2020 | |
| EP | 3613962 A1 * | | 2/2020 | ............ F02D 19/02 |
| JP | 06-200829 | | 7/1994 | |
| KR | 10-2018-0080046 | | 7/2018 | |
| KR | 20180080045 A * | | 7/2018 | |
| WO | WO-2012017856 A1 * | | 2/2012 | ............ F02D 11/10 |

* cited by examiner

GAS ENGINE HEAT PUMP AND METHOD OF OPERATING THE SAME

CROSS-REFERENCE TO RELATED APPLICATION(S)

This application claims priority under 35 U.S.C. § 119 to Korean Application No. 10-2020-0105221, filed in Korea on Aug. 21, 2020, whose entire disclosure(s) is/are hereby incorporated by reference.

BACKGROUND OF THE DISCLOSURE

Field of the Disclosure

The present disclosure relates to a gas engine heat pump and a method of operating the same, and more particularly, to a gas engine heat pump that runs a compressor in the heat pump connected by a drive pulley by running the gas engine, and a method of operating the same.

Related Art

A heat pump refers to a device that transfers heat from a low-temperature heat source to a high-temperature heat source or transfers heat from a high-temperature heat source to a low-temperature heat source by using heat generated by refrigerant or condensation heat. Generally, the heat pump may include a compressor, an outdoor unit including an outdoor heat exchanger or the like, and an indoor unit including an indoor heat exchanger or the like.

An engine is a device that generates power by using a fuel/air mixture (mixed fuel), and is used in various industrial fields such as air conditioning systems, cars, and power generating facilities. For example, the engine may be used in a heat pump system, and a compressor constituting a refrigeration cycle for cooling or heating may be run by a gas engine, not by electricity.

Meanwhile, if the operation of the heat pump is finished by a user input or the like, the engine also stops running. In general, the number of revolutions of the engine is abruptly decreased when the engine stops running. In this case, a mixed fuel with a low air-fuel ratio may remain within an intake manifold of the engine without being combusted. Also, when the engine starts up later, initial explosion does not occur properly due to the mixed fuel with a low air-fuel ratio that remains within the intake manifold, which gives rise to a possibility of failure to engine startup.

Moreover, the gas engine heat pump may have a charger, such as a supercharger or a turbocharger, which compresses a mixed fuel and supplies it to the engine, and a pressure difference is generated between an inlet and outlet of the charger. In this instance, if the number of revolutions of the engine is abruptly decreased when the engine stops running, the mixed fuel flows back to the inlet from the outlet of the charger due to the pressure difference between the inlet and outlet of the charger, causing an impeller in the charger to rotate backward.

In this case, the backward rotation of the impeller may release a bearing holding the impeller or cause the impeller to be separated from a rotating shaft and come into contact with an inner wall of a housing of the charger. This may lead to damage to the impeller, and, when the engine re-starts later, may result in damage to the engine because debris of the damaged impeller moves toward the engine.

SUMMARY

One aspect of the present disclosure is to solve the aforementioned problems and other problems.

Another aspect of the present disclosure is to provide a gas engine heat pump that operates in such a way as to stably exhaust a mixed fuel in an intake manifold when the engine stops running, and a method of operating the same.

Another aspect of the present disclosure is to provide a gas engine heat pump that controls the operation of a zero governor according to the number of revolutions of the engine by detecting the flow of a fuel-air mixture coming from a mixer.

The aspects of the present disclosure are not limited to the foregoing, and other aspects not mentioned herein will be able to be clearly understood to those skilled in the art from the following description.

An exemplary embodiment of the present disclosure provides a gas engine heat pump including: an engine including an ignition plug for burning a mixture of air and fuel; a compressor connected to the engine, for compressing refrigerant by an operation of the engine; a mixer for mixing the air and the fuel and supplying the mixture to the engine; a zero governor having a valve, for regulating the amount of fuel supply to the mixer; a throttle valve disposed between the mixer and the engine, for regulating the flow of the mixture entering the engine; and a controller, wherein the controller checks a current number of revolutions of the engine upon receiving a command to stop running the engine, changes a target number of revolutions of the engine if the current number of revolutions of the engine exceeds a first reference number of revolutions, so that the current number of revolutions of the engine reaches the first reference number of revolutions, controls the opening degree of the valve included in the zero governor in response to the change in the target number of revolutions of the engine, and controls the ignition plug to stop igniting if the current number of revolutions of the engine reaches a second reference number of revolutions which is lower than the first reference number of revolutions.

Another exemplary embodiment of the present disclosure provides a method of operating a gas engine heat pump, the method including: checking a current number of revolutions of the engine upon receiving a command to stop running the engine; changing a target number of revolutions of the engine if the current number of revolutions of the engine exceeds a first reference number of revolutions, so that the current number of revolutions of the engine reaches the first reference number of revolutions; controlling the opening degree of a valve included in a zero governor that regulates the amount of fuel supply to a mixer that mixes air and fuel and supplies the mixture to the engine, in response to the change in the target number of revolutions of the engine; and controlling the ignition plug to stop igniting if the current number of revolutions of the engine reaches a second reference number of revolutions which is lower than the first reference number of revolutions.

Specific details of other embodiments are included in the detailed description and drawings.

According to various embodiments of the present disclosure, the number of revolutions of the engine is gradually decreased when the engine stops running, and the operation of the zero governor is controlled so as to reduce and shut off the fuel supply to the mixer if a predetermined reference number of revolutions is reached. Thus, the fuel-air mixture remaining in the intake manifold may be stably burnt and exhausted, thereby preventing a fuel-air mixture with a lower fuel-air mixture from remaining in the intake manifold or the like of the engine.

Furthermore, according to various embodiments of the present disclosure, the flow of the fuel-air mixture supplied to the engine from the mixer may be detected based on the rotation speed of the fan rotated by the fuel-air mixture supplied to the engine from the mixer. Thus, if the target number of revolutions of the engine is changed, the operation of the zero governor may be precisely controlled according to the detected flow of the fuel-air mixture.

The effects of the present disclosure are not limited to the aforementioned effects, and other effects, which are not mentioned above, will be apparent to those skilled in the art from the description included in the appended claims.

BRIEF DESCRIPTION OF THE DRAWINGS

FIG. 2 is a view illustrating some components of the gas engine heat pump of FIG. 1.

DESCRIPTION OF EXEMPLARY EMBODIMENTS

The present disclosure will be described in detail below with reference to the drawings. In the drawings, to clearly and briefly explain the present disclosure, an illustration of elements having no connection with the description is omitted, and the same or extremely similar elements are designated by the same reference numerals throughout the specification.

Hereinafter, suffixes "module" and "unit, part, or portion" for components used herein in description are merely provided only for facilitation of preparing this specification, and thus they are not granted a specific meaning or function. Hence, it should be noted that "module" and "unit, part, or portion" are used interchangeably.

It will be further understood that the terms "comprise", "include", or "have" used in this specification, specify the presence of stated features, steps, numerals, operations, components, parts, or a combination thereof, but do not preclude the presence or addition of one or more other features, numerals, steps, operations, components, parts, or a combination thereof.

Although terms like a first and a second are used to describe various elements, the elements are not limited to the terms. The terms are used only to discriminate one element from another element.

Figure 1:
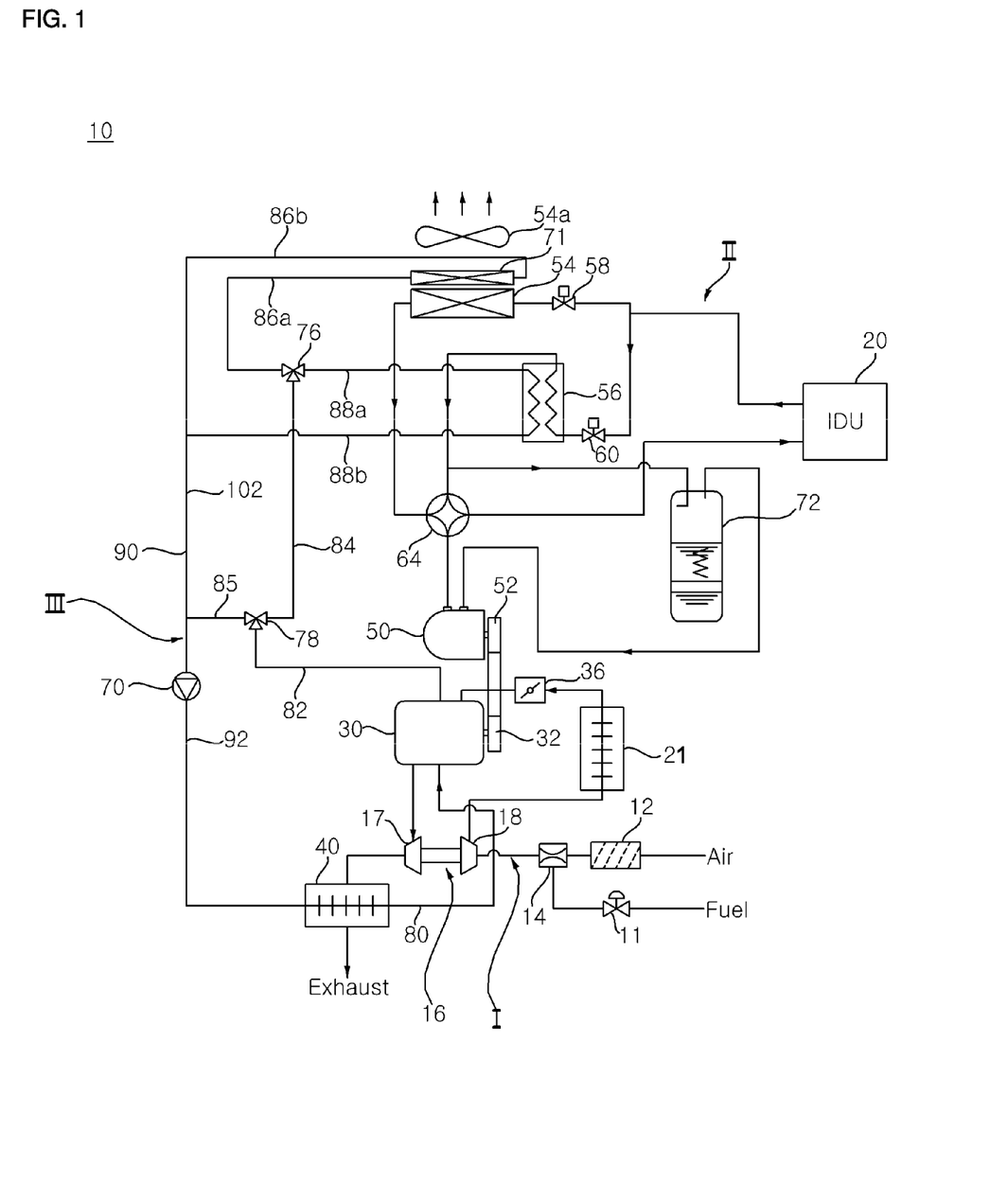
FIG. 1 is a schematic view of a configuration of a gas engine heat pump according to one embodiment of the present disclosure.

FIG. 1 is a schematic view of a configuration of a gas engine heat pump according to one embodiment of the present disclosure. FIG. 2 is a view illustrating some components of the gas engine heat pump of FIG. 1.

Referring to FIGS. 1 and 2, the gas engine heat pump 10 may include a gas engine portion I, a heat pump II, and/or a cooling water circulating portion III.

The gas engine portion I may include a zero governor 11 for supplying a fuel at a predetermined pressure or below, an air cleaner 12 that filters and releases air, a mixer 14 that mixes fuel and air with a certain mixing ratio, an engine 30 that works by burning the fuel, a throttle valve 36 that regulates the amount of fuel supplied to the engine 30, and/or an exhaust gas heat exchanger 40 that transfers heat between exhaust gases coming from the engine 30 and cooling water.

The zero governor 11 may refer to a device that supplies fuel always at a constant pressure by regulating the exit pressure to a constant level regardless of changes in the pressure or flow of fuel introduced into the zero governor 11. The zero governor 11 may provide a stable exit pressure over a wide range and regulate the pressure of gas fuel supplied to the engine 30 to an almost constant level in the form of atmospheric air. The zero governor 11 may have two solenoid valves to shut off the fuel supply.

The air cleaner 12 may use a filter to shut off entry of moisture and oil in the form of dust and mist contained in outside air.

The engine 30 may refer to an internal combustion engine that works through a process of burning compressed gases. The engine 30 may rotate an engine drive pulley 32 disposed on one side of the engine 30 through 4 strokes of intake, compression, explosion, and exhaust.

The engine drive pulley 32 may rotate a compressor drive pulley 52 which is to be described below.

The engine 30 may include a plurality of pistons (not shown), a plurality of cylinders (not shown) that ignite a supplied fuel so that the piston in each cylinder reciprocates, a connecting rod (not shown) that converts the reciprocating motion of the pistons to rotational motion, and a crank shaft (not shown) that rotates in connection with the connecting rod.

The engine 30 may further include an intake manifold 31 that supplies the fuel-air mixture delivered to the engine 30 through the throttle valve 36 to each of the cylinders and/or an exhaust manifold 33 that collects exhaust gases coming from the cylinders.

The intake manifold 31 may be formed with a plurality of distribution ducts to distribute the fuel to each of the cylinders, and the exhaust manifold 33 may be formed with a plurality of ducts that are respectively connected to the cylinders and converge into one exhaust duct.

The engine 30 may include a cam sensor (not shown) that detects a top dead center of a piston and a crank sensor (not shown) that provides information to calculate the number of revolutions of the engine 30. For example, the gas engine heat pump 10 may determine the position of a piston with respect to the top dead center by comparing signals from the cam sensor and the crank sensor, and may control the fuel injection timing and operating conditions for each cylinder based on the position of the piston.

The engine 30 may further include a starter motor (not shown) for starting the engine and an ignition plug (not shown) for igniting the fuel-air mixture that has passed through the compression stroke.

The exhaust gas heat exchanger 40 may transfer heat between exhaust gases coming from the engine 30 and cooling water. For example, the exhaust gas heat exchanger 40 may transfer heat between exhaust gases coming from the engine 30 and cooling water that is pumped to flow by the cooling water pump 70. In this case, the cooling water passed through the exhaust gas heat exchanger 40 may re-enter the engine 30 to cool the engine 30.

Meanwhile, according to various embodiments of the present disclosure, the gas engine portion I may further include a turbocharger 16 for compressing the fuel-air mixture supplied to the engine 30 and an intercooler 21 for cooling the fuel-air mixture compressed in the turbocharger 16. In this drawing, the turbocharger 16 is illustrated as an example of the charger, but the present disclosure is not limited thereto and the gas engine heat pump 10 may have a supercharger.

The turbocharger 16 may compress the fuel-air mixture into a high-temperature, high-pressure state and supply it into the engine 30. For example, a turbine 17 of the turbocharger 16 may spin using exhaust gases coming from the engine 30, and blades 18 connected to the turbine 17 may compress the fuel-air mixture flowing into the engine 30. In this case, the turbine 17 and the blades 18 may be connected by a single rotating shaft.

The intercooler 21 may cool a high-temperature fuel-air mixture supplied to the engine 30 through the turbocharger 16, by using air or water.

The heat pump II may include an indoor unit 20, at least one compressor 50 for compressing refrigerant, an outdoor heat exchanger 54 for transferring heat between refrigerant and outdoor air, an auxiliary heat exchanger 56 for transferring heat between refrigerant and cooling water, an expansion valve 58 disposed between the indoor unit 20 and the outdoor heat exchanger 54 to expand flowing refrigerant, a reversing valve 64, and an accumulator 72.

The indoor unit 20 may include an indoor heat exchanger (not shown) for transferring heat between refrigerant and indoor air and/or an indoor unit fan (not shown) that rotates to cause indoor air to flow to an indoor space after heat exchange, by which the temperature of the indoor space may be controlled.

The compressor 50 may be connected to the engine 30 and compress refrigerant by the engine 30's operation. For example, the compressor 50 may be connected to the compressor drive pulley 52, and when the engine drive pulley 32 rotates by running the engine 30, the compressor drive pulley 52 connected to the engine drive pulley 32 rotates, thereby compressing the refrigerant.

An outdoor unit fan 54a that forms an air flow may be disposed in the outdoor heat exchanger 54 to transfer heat between outdoor air and refrigerant. Meanwhile, a heat radiator 71 may be disposed in the outdoor heat exchanger 54 to cool cooling water with air.

The auxiliary heat exchanger 56 may transfer heat between cooling water for cooling the engine 30 and refrigerant, and may include a plate-type heat exchanger.

A first expansion valve 58 may be disposed between the indoor unit 20 and the outdoor heat exchanger 54, and a second expansion valve 60 may be disposed between the indoor unit 20 and the auxiliary heat exchanger 56.

The reversing valve 64 may deliver a high-temperature, high-pressure refrigerant coming from the compressor 50 to the outdoor heat exchanger 54 or the indoor unit 20 depending on the operation mode of the heat pump.

The accumulator 72 may separate a liquid refrigerant from an incoming refrigerant and supply a gaseous refrigerant to the compressor 50. The accumulator 72 may operate as a resistor in the circulation of refrigerant, since it separates the liquid refrigerant and the gaseous refrigerant from each other and discharges the gaseous refrigerant.

The cooling water circulating portion Ill may circulate cooling water to absorb heat produced from the engine 30 and emit the absorbed heat through a separate heat exchanger or the like. The cooling water circulating portion Ill may operate in such a way that cooling water passes through the exhaust gas heat exchanger 40 and the engine 30 sequentially, thereby absorbing heat emitted from exhaust gases and heat produced from the engine 30.

The cooling water circulating portion Ill may include a cooling water pump 60 that circulates cooling water or regulates the flow rate of cooling water.

The cooling water circulating portion Ill may cool cooling water by means of the heat radiator 71, disposed on one side of the outdoor heat exchanger 54 which transfers heat between refrigerant and air, and/or the auxiliary heat exchanger 56 which transfers heat between refrigerant and cooling water.

The cooling water circulating portion Ill may further include a first three-way valve 76 that selectively sends cooling water to the heat radiator 71 or the auxiliary heat exchanger 56 after heat exchange in the engine 30 and a second three-way valve 78, upstream of the first three-way valve 76, that sends cooling water to the cooling water pump 70 or the first three-way valve 76 after heat exchange in the engine 30.

The cooling water coming from the engine 30 may enter the second three-way valve 78 via an engine outlet duct 82, and the cooling water introduced into the second three-way valve 78 may flow to the cooling water pump 70 or the first three-way valve 76.

The cooling water introduced into the first three-way valve 76 may be supplied to the heat radiator 71 through an outdoor heat exchanger inlet duct 86a or to the auxiliary heat exchanger 56 through an auxiliary heat exchanger inlet duct 88a.

The cooling water flowing through an outdoor heat exchanger outlet duct 86b after being discharged from the heat radiator 71 and the cooling water flowing through an auxiliary heat exchanger outlet duct 88b after being discharged from the auxiliary heat exchanger 56 may flow to a cooling water pump inlet duct 90 and then enter the cooling water pump 70.

The cooling water coming from the cooling water pump 70 may enter the exhaust gas heat exchanger 40 through a cooling water pump outlet duct 92, and the cooling water coming from the exhaust gas heat exchanger 40 may be supplied to the engine 30 through an engine inlet duct 80.

The gas engine heat pump 10 may further include a muffler disposed on an exit side of the exhaust gas heat exchanger 40 to reduce noise generated by exhaust gases and a drain filter for purifying condensate water produced in the muffler.

The gas engine heat pump 10 may further include a controller (not shown) for controlling the overall operations of the components.

The controller also may be disposed in the gas engine portion I, the heat pump II, or the cooling water circulating portion III.

The controller may include at least one processor, and may control the overall operation of the gas engine heat pump 10 by using the processor included in it. Here, the processor may be a general processor such as a central processing unit (CPU). Also, the processor may be a dedicated device such as an ASIC or other hardware-based device.

Figure 3A:
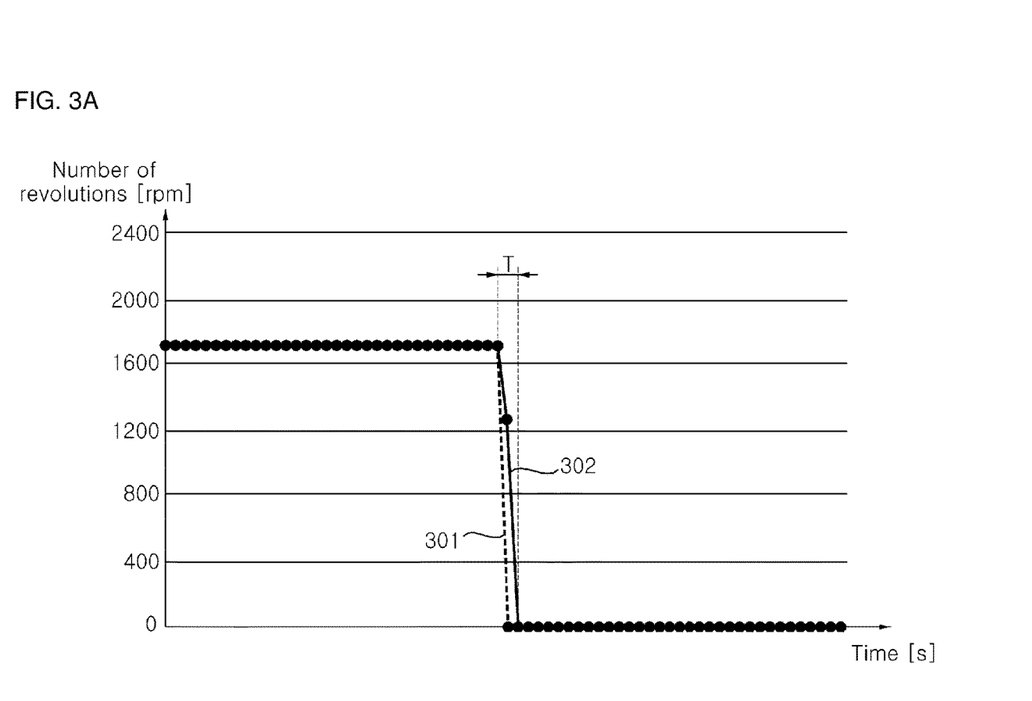
FIGS. 3A; 3B; and 3C are views to be referenced to explain changes in the number of revolutions of a conventional engine.
Figure 3B:
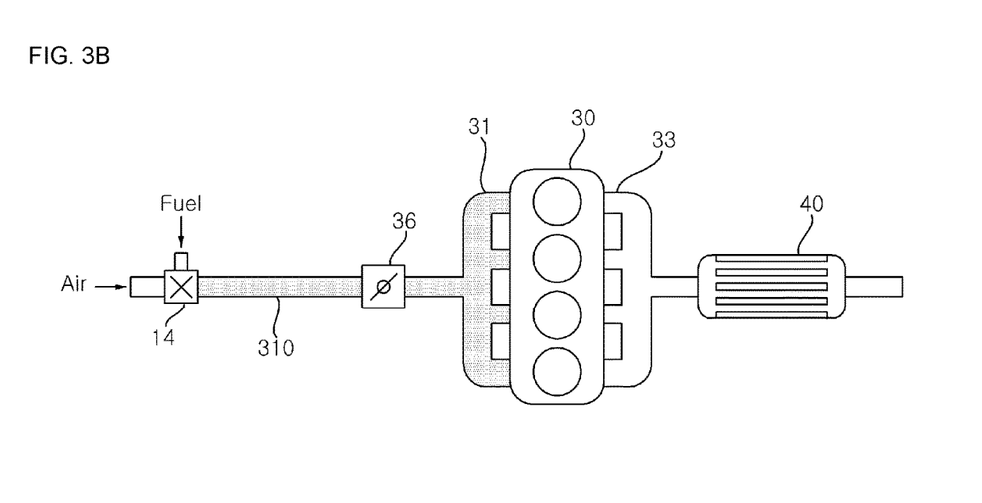
Figure 3C:
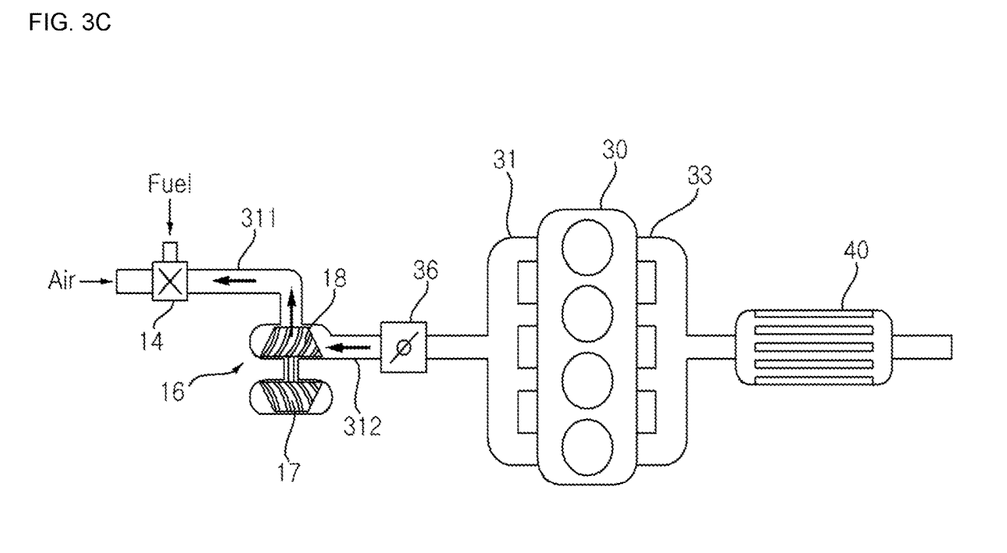

FIGS. 3A; 3B; and 3C are views to be referenced to explain changes in the number of revolutions of a conventional engine.

FIG. 3A is a graph showing the number of revolutions of the engine 30 changing with a target number of revolutions of the engine 30 when the conventional engine 30 stops running.

Referring to FIG. 3A, in the conventional art, when the engine 30 stops running, the target number of revolutions of the engine 30 abruptly drops to 0 rpm, and the number of revolutions of the engine 30 also changes to 0 rpm in a very short time T, along with the change in the target number of revolutions of the engine 30.

Referring to FIG. 3B, in a case where the gas engine heat pump 10 has no charger, a mixture of air and fuel from the mixer 14 may be supplied to the engine 30 through the throttle valve 36.

In this instance, if the number of revolutions of the engine 30 abruptly changes to 0 rpm, as in the conventional art, a mixture with a low air-fuel ratio may remain within a pipe 310 connecting the mixer 14 and the throttle valve 36 and within the intake manifold 31 of the engine 30.

Meanwhile, referring to FIG. 3C, in a case where the gas engine heat pump 10 has a turbocharger 16, a mixture of air and fuel from the mixer 14 may be supplied to the turbocharger 16, and the fuel-air mixture compressed in a high-temperature, high-pressure state in the turbocharger 16 may be supplied to the engine 30 through the throttle valve 36.

In this case, if the number of revolutions of the engine 30 abruptly changes to 0 rpm, as in the conventional art, the pressure in a pipe 311 connecting the mixer 14 and the turbocharger 16 is lower than the pressure in a pipe 312 connecting the turbocharger 16 and the throttle valve 36. Thus, the fuel-air mixture may flow back to the turbocharger 16 from the engine 30, which may cause the blades 18 of the turbocharger 16 to rotate backward.

Figure 4:
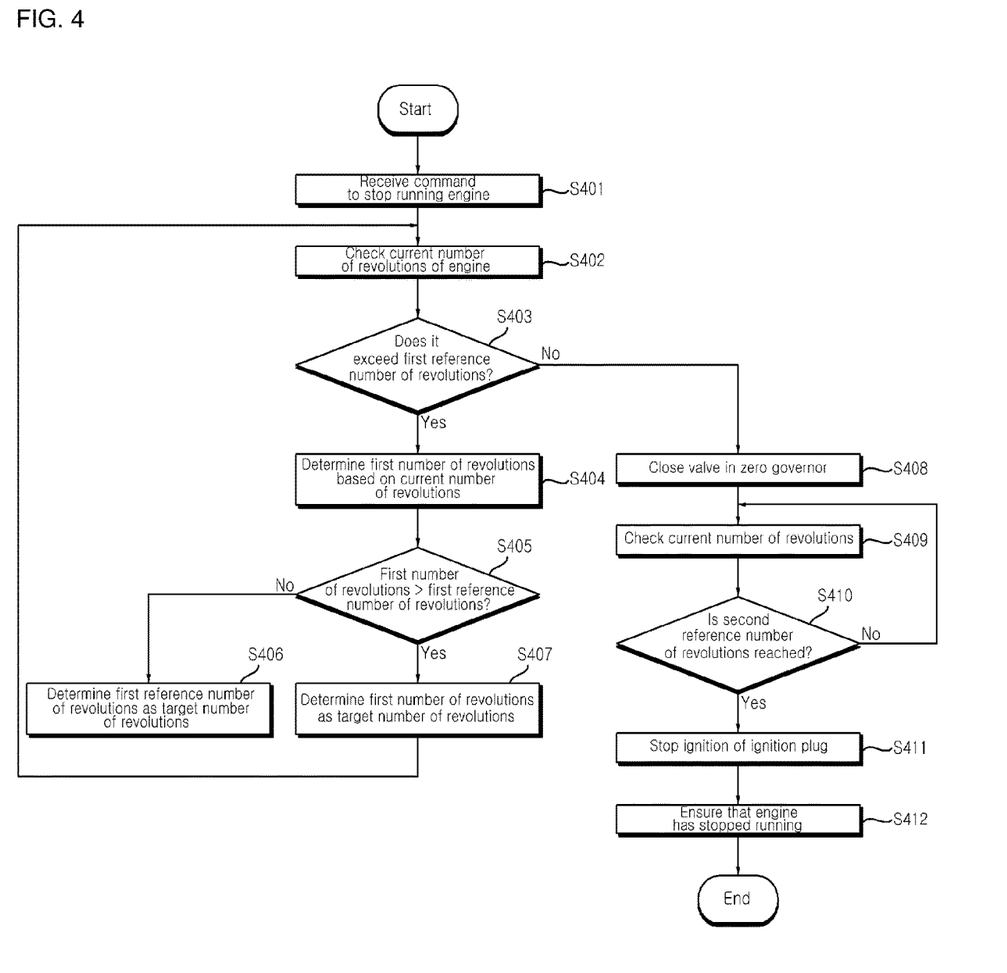
FIG. 4 is a flowchart of a method operating a gas engine heat pump according to one embodiment of the present disclosure.

FIG. 4 is a flowchart of a method operating a gas engine heat pump according to one embodiment of the present disclosure.

Referring to FIG. 4, in the step S401, the gas engine heat pump 10 may receive a command to stop running the engine 30. For example, upon receiving a user input to stop the operation of every indoor unit 20, the gas engine heat pump 10 may determine that it has received a command to stop running the engine 30.

In the step S402, the gas engine heat pump 10 may check a current number of revolutions of the engine 30. For example, the gas engine heat pump 10 may calculate the current number of revolutions of the engine 30 based on a sensing value of the cam sensor and/or crank sensor in the engine 30.

In the step S403, the gas engine heat pump 10 may determine whether the current number of revolutions of the engine 30 exceeds a preset, first reference number of revolutions or not. Here, the first reference number of revolutions may refer to a number of revolutions (e.g., 900 rpm) that determines a segment during which the target number of revolutions of the engine 30 gradually decreases.

In the step S404, if the current number of revolutions of the engine 30 exceeds the preset, first reference number of revolutions, the gas engine heat pump 10 may determine a first number of revolutions based on the current number of revolutions of the engine 30. Here, the first number of revolutions may refer to a preliminary target number of revolutions used to determine the target number of revolutions of the engine 30.

For example, the gas engine heat pump 10 may calculate the first number of revolutions to be lower than the current number of revolutions of the engine 30 by a set percentage (e.g., 20%).

In the step S405, the gas engine heat pump 10 may determine whether the first number of revolutions exceeds the first reference number of revolutions or not.

In the step S406, if the first number of revolutions is lower than or equal to the first reference number of revolutions, the gas engine heat pump 10 may determine that the first reference number of revolutions as the target number of revolutions of the engine 30.

In the step S407, if the first number of revolutions exceeds the first reference number of revolutions, the gas engine heat pump 10 may determine the first number of revolutions as the target number of revolutions of the engine 30.

Meanwhile, if the target number of revolutions of the engine 30 is changed, the gas engine heat pump 10 may return to the step S402 to re-check the current number of revolutions of the engine 30 and gradually decrease the target number of revolutions of the engine 30 until the current number of revolutions of the engine 30 reaches the first reference number of revolutions.

Meanwhile, the gas engine heat pump 10 may control the opening degree of a valve included in the zero governor 11 so as to change the amount of fuel supply to the mixer 14 in response to the change in the target number of revolutions of the engine 30. For example, if the first number of revolutions, which is 20% lower than the current number of revolutions of the engine 30, is determined as the target number of revolutions of the engine 30, the opening degree of a valve included in the zero governor 11 may be controlled to reduce the amount of fuel supply to the mixer 14 by 20%.

In this case, the load on the engine 30 is very low while the engine 30 stops running. Thus, even if the air-fuel ratio of the mixture supplied to the engine 30 increases, the engine 30 may perform a lean burn operation, in response to the change in the opening degree of a valve included in the zero governor 11.

Meanwhile, in the step S408, if the current number of revolutions of the engine 30 is lower than or equal to the first reference number of revolutions, the gas engine heat pump 10 may control to close every valve included in the zero governor 11, so as to shut off the fuel supply to the mixer 14.

In this case, as the fuel supply to the mixer 14 is shut off, the engine 30 may thereafter burn the fuel that remains in the pipe 310 connecting the mixer 14 and the throttle valve 36, the intake manifold 31 of the engine 30, the pipe 311 connecting the mixer 14 and the turbocharger 16, and the pipe 312 connecting the turbocharger 15 and the throttle valve 36, and the mixture may have a very high air-fuel ratio.

Meanwhile, in a case where the gas engine heat pump 10 has a supercharger that is powered by the engine 30 and/or an electric motor, if the current number of revolutions of the engine is lower than or equal to the first reference number of revolutions, the operation of the electric motor driving the supercharger may be stopped.

In the steps S409 and S410, the gas engine heat pump 10 may check the current number of revolutions of the engine 30 and determine whether the current number of revolutions of the engine 30 reaches a preset, second reference number of revolutions or not. Here, the second reference number of revolutions may refer to a number of revolutions (e.g., 600 rpm) that determines whether to stop the ignition of the ignition plug included in the engine 30.

In the step S411, if the current number of revolutions of the engine 30 reaches the preset, second reference number of revolutions, the gas engine heat pump 10 may control the ignition plug to stop igniting.

In this case, as the ignition of the ignition plug is stopped, no explosion stroke occurs within the cylinder and the temperature in the cylinder may therefore decrease. Also, as the mixture, which is mostly air, is discharged by the rotational inertia of the engine 30, the pressures in the pipe 310 connecting the mixer 14 and the throttle valve 36, the intake manifold 31 of the engine 30, the pipe 311 connecting the mixer 14 and the turbocharger 16, and the pipe 312 connecting the turbocharger 16 and the throttle valve 36 may be lowered.

In the step S412, the gas engine heat pump 10 may ensure that the engine 30 has stopped running. For example, the gas engine heat pump 10 may ensure that the engine 30 has stopped running, based on a sensing value of the cam sensor and/or crank sensor in the engine 30.

Figure 5:
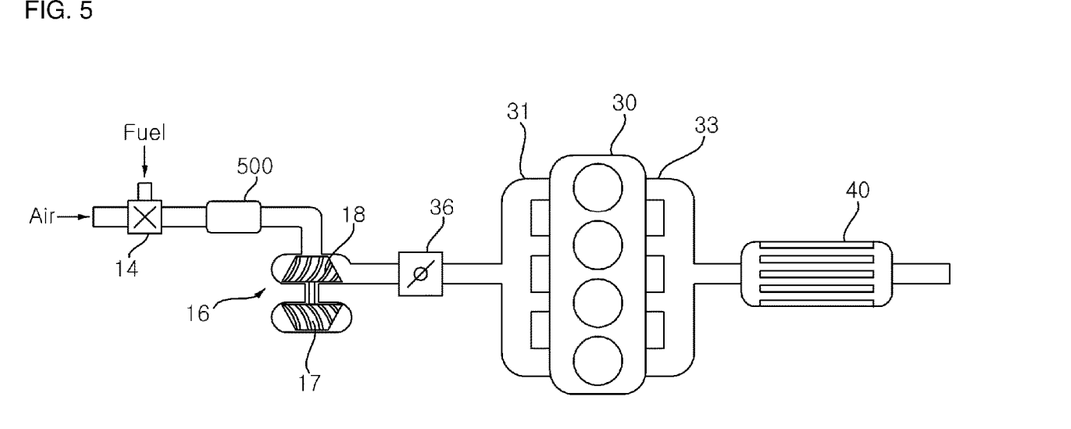
FIG. 5 is a view illustrating some components of the gas engine heat pump of FIG. 1 according to another embodiment of the present disclosure.
Figure 6:
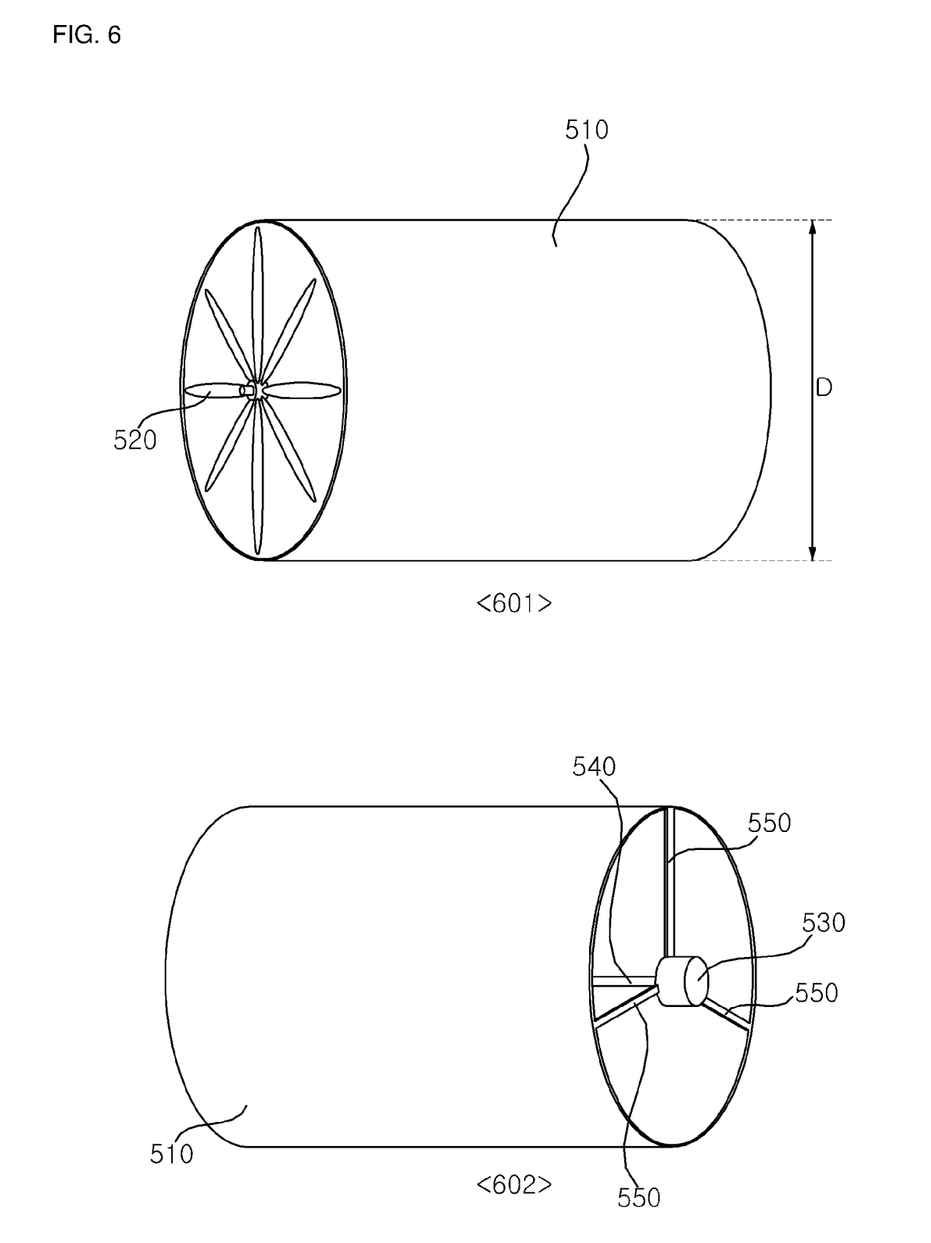
FIG. 6 is a view to be referenced to explain a configuration of a flow detecting portion according to one embodiment of the present disclosure.

FIG. 5 is a view illustrating some components of the gas engine heat pump of FIG. 1 according to another embodiment of the present disclosure. FIG. 6 is a view to be referenced to explain a configuration of a flow detecting portion according to one embodiment of the present disclosure.

Referring to FIGS. 5 and 6, the gas engine heat pump 10 may further include a flow detecting portion 500 that detects the flow of a fuel-air mixture supplied to the engine 30.

The flow detecting portion 500 may include a housing 510, a fan 520 that rotates by the fuel-air mixture supplied to the engine 30, a signal output circuit 530 that outputs a signal corresponding to the rotation of the fan 520, a rotating shaft 540 connecting the fan 520 and the signal output circuit 530, and a fixing portion 550 for fixing the position of the signal output circuit 530.

The flow detecting portion 500 may be disposed on a pipe on an exit side of the mixer 14. For example, it may be disposed on an exit side of the mixer 14 and detect the flow of a fuel-air mixture coming from the mixer 14. In this instance, the diameter D of the housing 510 of the flow detecting portion 500 may correspond to the diameter of a pipe connected to the exit side of the mixer 14.

Although these drawings illustrate that the housing 510 has a cylindrical shape whose upper and lower ends are open, the present disclosure is not limited to this.

The controller of the gas engine heat pump 10 may control the operation of the zero governor 11 based on the flow of the fuel-air mixture detected by the flow detecting portion 500. For example, in a case where the fuel-air mixture supplied to the engine 30 has a preset fuel-air ratio, the controller may control the opening degree of a valve included in the zero governor 11 so that the amount of fuel supply increases as much as the flow of the fuel-air mixture supplied to the engine 30 increases.

If the target number of revolutions of the engine 30 is changed, the controller may control the operation of the zero governor 11 based on the flow of the fuel-air mixture detected by the flow detecting portion 500. For example, in a case where the opening degree of a valve included in the zero governor 11 is decreased so that the amount of fuel supply decreases in response to a gradual decrease in the target number of revolutions of the engine 30, if the flow of the fuel-air mixture supplied to the engine 30 is decreased, the controller may control the opening degree of the valve included in the zero governor 11 so as to further decrease the amount of fuel supply.

As described above, according to various embodiments of the present disclosure, the number of revolutions of the engine 30 is gradually decreased when the engine 30 stops running, and the operation of the zero governor 12 is controlled so as to reduce and shut off the fuel supply to the mixer 14 if a predetermined reference number of revolutions is reached. Thus, the fuel-air mixture remaining in the intake manifold 31 may be stably burnt and exhausted, thereby preventing a fuel-air mixture with a lower fuel-air mixture from remaining in the intake manifold 31 or the like of the engine 30.

Furthermore, according to various embodiments of the present disclosure, the flow of the fuel-air mixture supplied to the engine 30 from the mixer 14 may be detected without additional power consumption, based on the rotation speed of the fan 520 rotated by the fuel-air mixture supplied to the engine 30 from the mixer 14. Thus, if the target number of revolutions of the engine 30 is changed, the operation of the zero governor 11 may be precisely controlled according to the detected flow of the mixture.

The accompanying drawings are only for easily understanding the exemplary embodiment disclosed in the specification and the technical spirit disclosed in the specification is not limited by the accompanying drawings and it should appreciated that the accompanying drawings include all changes, equivalents, or substitutions included in the spirit and the technical scope of the present disclosure.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous.

In addition, although the exemplary embodiments of the present disclosure have been shown and described above, the present disclosure is not limited to the specific embodiments described above, and the technical field to which the present disclosure belongs without departing from the gist of the present disclosure claimed in the claims. In addition, various modifications can be carried out by a person having ordinary knowledge, and these modifications should not be individually understood from the technical idea or prospect of the present disclosure.

What is claimed is:

1. A gas engine heat pump, comprising:
  an engine including an ignition plug for burning a mixture of air and fuel;
  a compressor connected to the engine, for compressing a refrigerant by an operation of the engine;
  a mixer that mixes the air and the fuel and supplies the mixture to the engine;
  a zero governor having a valve, that regulates an amount of fuel supply to the mixer;
  a throttle valve disposed between the mixer and the engine, that regulates a flow of the mixture entering the engine; and
  a controller configured to;
    check a current number of revolutions of the engine upon receiving a command to stop running the engine;
    when the current number of revolutions of the engine exceeds a first reference number of revolutions, change a target number of revolutions of the engine such that the target number of revolutions of the engine gradually decreases;
    control the valve such that an opening degree of the valve included in the zero governor is gradually decreased in response to the change in the target number of revolutions of the engine; and
    control the ignition plug to stop igniting if the current number of revolutions of the engine reaches a second reference number of revolutions which is lower than the first reference number of revolutions.

2. The gas engine heat pump of claim 1, wherein the controller is configured to control the valve included in the zero governor to close so that the fuel supply to the mixer is shut off when the current number of revolutions of the engine is lower than or equal to the first reference number of revolutions.

3. The gas engine heat pump of claim 1, wherein the controller is configured to:
calculate a first number of revolutions to be lower than the current number of revolutions of the engine by a predefined percentage if the current number of revolutions of the engine exceeds the first reference number of revolutions,
determine the first number of revolutions as the target number of revolutions of the engine if the first number of revolutions is higher than the first reference number of revolutions, and
determine the first reference number of revolutions as the target number of revolutions of the engine if the first number of revolutions is lower than the first reference number of revolutions.

4. The gas engine heat pump of claim 1, further comprising a charger having at least one of a supercharger or a turbocharger, which is disposed between the mixer and the throttle valve and compresses the mixture coming from the mixer and supplies the mixture to the throttle valve.

5. The gas engine heat pump of claim 4, wherein the controller is configured to stop an operation of an electric motor driving the supercharger when the charger has the supercharger and the current number of revolutions of the engine is lower than or equal to the first reference number of revolutions.

6. The gas engine heat pump of claim 4, further comprising an intercooler disposed between the charger and the throttle valve, wherein the intercooler cools the mixture coming from the charger and supplies the cooled mixture to the throttle valve.

7. The gas engine heat pump of claim 1, further comprising a flow detecting portion having a fan that is rotated by the mixture supplied to the engine, that detects the flow of the mixture supplied to the engine based on a rotational speed of the fan, wherein the controller is configured to control an operation of the zero governor based on the flow of the mixture detected by the flow detecting portion when the target number of revolutions of the engine is changed.

8. The gas engine heat pump of claim 7, wherein the controller is configured to control the valve such that the opening degree of the valve included in the zero governor is decreased, in response to a decrease in the flow of the mixture.

9. The gas engine heat pump of claim 8, wherein the flow detecting portion is disposed on an exit side of the mixer.

10. The gas engine heat pump of claim 9, wherein the flow detecting portion further includes a housing in which the fan is rotatably provided, a signal output circuit that outputs a signal based on the rotational speed of the fan, a rotational shaft that connects the fan and the signal output circuit, and a fixing portion to fix a position of the signal output circuit.

11. The gas engine heat pump of claim 10, wherein a diameter of the housing of the flow detecting portion corresponds to a diameter of a pipe connected to the exit side of the mixer.

12. The gas engine heat pump of claim 11, wherein the housing of the flow detecting portion has a cylindrical shape having open side ends.

13. The gas engine heat pump of claim 1, further comprising an air cleaner that filters air, wherein the air filtered by the air cleaner is supplied to the mixer.

14. The gas engine heat pump of claim 1, further comprising an exhaust gas heat exchanger that performs heat exchange between exhaust gases coming from the engine and cooling water.

15. A method of operating a gas engine heat pump, the method comprising:
checking a current number of revolutions of an engine upon receiving a command to stop running the engine;
when the current number of revolutions of the engine exceeds a first reference number of revolutions, changing a target number of revolutions of the engine so that the current number of revolutions of the engine gradually decreases;
controlling a valve included in a zero governor such that an opening degree of the valve is gradually decreased in response to the change in the target number of revolutions of the engine, wherein the zero governor is configured to regulate an amount of fuel supply to a mixer that mixes air and fuel and supplies the mixture to the engine; and
controlling an ignition plug to stop igniting if the current number of revolutions of the engine reaches a second reference number of revolutions which is lower than the first reference number of revolutions.

* * * * *